US006416910B1

(12) United States Patent
Iimura et al.

(10) Patent No.: US 6,416,910 B1
(45) Date of Patent: Jul. 9, 2002

(54) LIGHT SCATTERING RESIN LAYER, COLOR FILTER AND LIQUID CRYSTAL DISPLAY USING THE SAME

(75) Inventors: Kiyotoshi Iimura, Tsukuba; Susumu Miyazaki, Kitasoma-gun; Koichi Fujisawa, Tsukuba, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 127 days.

(21) Appl. No.: 09/644,304

(22) Filed: Aug. 23, 2000

(30) Foreign Application Priority Data

Aug. 25, 1999 (JP) ........................................ 11-238544

(51) Int. Cl.[7] .......................... G02B 5/02; G02F 1/1335

(52) U.S. Cl. .......................... 430/7; 349/106; 349/112; 428/1.3; 428/1.5; 359/599

(58) Field of Search ............................ 430/7; 349/106, 349/112; 359/599; 428/1.3, 1.5

(56) References Cited

U.S. PATENT DOCUMENTS 3,655,263 A * 4/1972 Hoffman et al. ............ 350/126
6,166,793 A * 12/2000 Hayashi et al. ............ 349/113

FOREIGN PATENT DOCUMENTS

| | | | |
|---|---|---|---|
| EP | 0 269 324 A2 | | 6/1988 |
| EP | 0 342 283 A1 | | 11/1989 |
| EP | 0 561 551 A1 | | 9/1993 |
| JP | 54-155244 A | * | 12/1979 |
| JP | 7270771 | | 10/1995 |
| JP | 10206837 | | 8/1998 |
| JP | 11038208 | | 2/1999 |
| JP | 11080688 | | 3/1999 |
| JP | 11095012 | | 4/1999 |
| JP | 11508622 | | 7/1999 |

* cited by examiner

*Primary Examiner*—John A. McPherson
(74) *Attorney, Agent, or Firm*—Birch, Stewart, Kolasch & Birch, LLP

(57) ABSTRACT

Provided is a light scattering resin layer providing scattering of a transmitted light by dispersion of an inorganic fine particle in a transparent resin, wherein said fine particle is a polyhedral particle having substantially no fractured surface, L/S ratio is 2.0 or less when the major axis length is represented by L and the minor axis length is represented by S, the number-average particle diameter of said fine particle is 0.1 μm or more and 20.0 μm or less, and the particle size distribution in terms of D90/D10 value is 7 or less when particle diameters at 10% cumulation and 90% cumulation from smaller particle side of cumulative particle size distribution are represented by D10 and D90, respectively. The light scattering layer has a good dispersibility of a fine particle in a transparent resin, improved forward scattering property, and excellent light transmittance and used for a color filter, a light scattering plate, a light scattering adhesive layer, and a liquid crystal display.

13 Claims, 1 Drawing Sheet

Figures

LIGHT SCATTERING RESIN LAYER, COLOR FILTER AND LIQUID CRYSTAL DISPLAY USING THE SAME

BACKGROUND OF THE INVENTION

1. Field of the Invention

The present invention relates to a color filter, a light scattering plate, a light scattering adhesive layer, in which a light scattering layer is provided for enlarging visibility angle and for improving display quality, and a liquid crystal display apparatus using at least one of them 2. Description of the Related Art Liquid crystal display panels have features such as thin form, light weight, low electric power consumption and the like, and are spreading widely as a display instead of CRT (cathode ray tube) and demand thereof is increasing further, recently. Further, these panels are used in various fields, and the commercial trend is directed to a larger screen and higher fineness.

Though liquid crystal display panels have merits such as thin form and driving with lower electric power, light transmission, brightness and viewing angle thereof are insufficient, and particularly, there is an eager desire for improvement in the viewing angle which is significantly narrower as compared with CRT.

In one method for enlarging the viewing angle of a liquid crystal display panel, lights transmitted through the liquid crystal display panel are allowed to scatter to all directions to level lights within the viewing angle. enlarging the viewing angle, and as the method to scatter lights transmitting the panel, a scattering plate is generally used.

As the method for scattering lights by a scattering plate, there are listed a method in which fine particle are dispersed in a scattering plate leading to scattering of lights, a method in which the surface of a scattering plate is roughened to cause scattering of lights, a method in which a grating-like fine structure is formed on the surface of a scattering plate leading to scattering of lights, as well as other methods, and among them, a method In which lights are scattered by fine particles dispersed in a scattering plate is most frequently used.

As the method for integrating a scattering layer into a liquid crystal panel, there are suggested a method in which a light scattering film is pasted on the surface of a liquid crystal panel, a method in which a light scattering adhesive having light scattering function is used as an adhesive in pasting a polarizing plate, a method in which a light scattering layer produced by dispersing fine particles in a resin is formed on a color filter, and the like, and some of them are disclosed. For example, JP-A No. 10-206837 discloses a method in which a light scattering layer produced by dispersing a transparent pigment of high refractive index such as cerium oxide and the like having an average particle diameter of 0.4 $\mu$m to 4 $\mu$m and a refractive index of over 1.8 in a resin is placed on the observation substrate side.

Further, JP-A No. 7-218705 discloses a light scattering film in which an acrylic fine particle having an average particle diameter of 1 $\mu$m to 50 $\mu$m is dispersed The object of the present invention is to provide a light scattering layer in which the dispersibility of a fine particle in a transparent resin as a matrix is large and forward scattering property is improved and light transmittance is excellent, and to provide a color filter, a light scattering plate, a light scattering adhesive layer, in which scattering property is improved while maintaining high transmittance of lights, and a liquid crystal display using at least one of them.

SUMMARY OF THE INVENTION

The present inventors have intensively studied for solving the above-mentioned problems, and resultantly, found that a light scattering layer in which forward scattering property is improved and light transmittance is excellent can be formed by using a specific fine particle as a scattering material, leading to completion of the present invention.

Namely, the present invention provides the following (1) to (6) aspects.

(1) A light scattering resin layer providing scattering of a transmitted light by dispersion of an inorganic fine particle in a transparent resin, wherein the above-mentioned fine particle is a polyhedral particle having, substantially no fractured surface, L/S ratio is 2 0 or less when the major axis length is represented by L and the minor axis length is represented by S, the number-average particle diameter of the above-mentioned fine particle is 0.1 $\mu$m or more and 20.0 $\mu$m or less, and the particle size distribution in terms of D90/D10 value is 7 or less when particle diameters at 10% cumulation and 90% cumulation from smaller particle side of cumulative particle size distribution are represented by D10 and D90, respectively.

(2) A color filter for a liquid crystal display, wherein the light scattering resin layer of (1) is provided on one surface or both surfaces of a transparent substrate or on a color filter layer.

(3) A liquid crystal display, wherein the color filter for a liquid crystal display of (2) is contained as a constituent element.

(4) A light scattering plate, wherein the light scattering resin layer of (1) is used on the surface of or in a scattering plate.

(5) A light scattering adhesive layer, wherein light scattering function is imparted to an adhesive layer by using a resin having adhesion as the above-mentioned transparent resin in the light scattering resin layer of (1).

(6) A liquid crystal display, wherein the light scattering plate of (4) or (5) is equipped on at least one side either of the outer side or the inner side of a liquid crystal cell.

Figure 1:
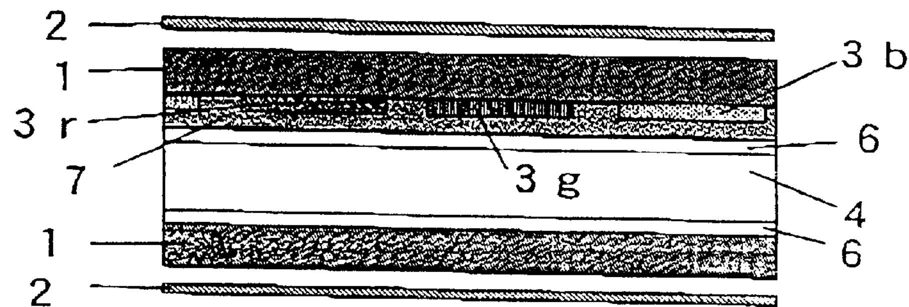
FIG. 1 is a view illustrating one example of a liquid crystal display integrating as a constituent element a color filter endowed with scattering function of the present invention.
Figure 2:
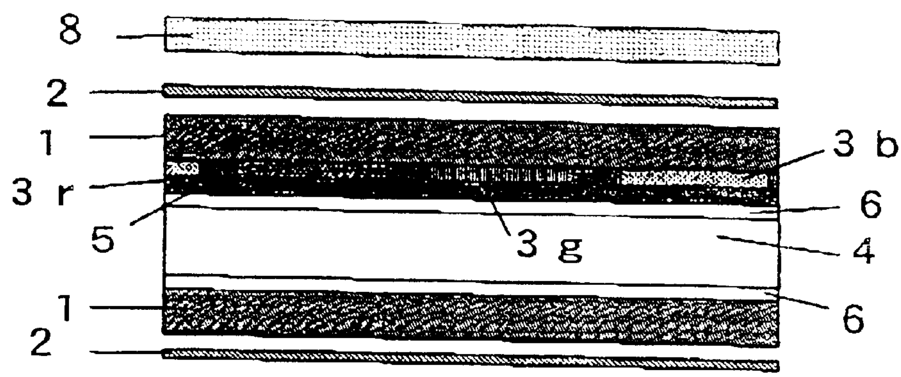
FIG. 2 is a view illustrating one example of a liquid crystal display integrating as a constituent element a light scattering plate of the present invention.
Figure 3:
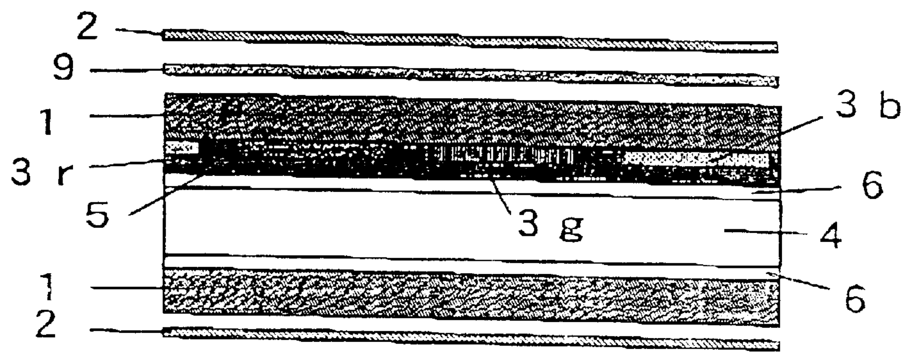
FIG. 3 is a view illustrating one example of a liquid crystal display integrating as a constituent element a light scattering adhesive layer of the present Invention.

1: Glass substrate
2: Polarizing plate
3r: Red color filter
3g: Green color filter
3b: Blue color filter
4: Liquid crystal layer
5: Over coat layer
6: Transparent electrode
7: Light scattering over coat layer
8: Light scattering plate
9: Light scattering adhesive layer

DETAILED DESCRIPTION OF THE INVENTION

The light scattering layer of the present invention is a light scatering layer wherein a transparent inorganic fine particle is dispersed in the transparent resin as matrix, for importing light scattering effect, and the inorganic fine particle used as a scattering material is an inorganic fine particle wherein the particle is a polyhedral particle having substantially no fractured surface, L/S ratio is 2.0 or less when the major axis length is represented by L and the minor axis length is represented by S, the number-average particle diameter of the fine particle is 0.1 $\mu$m or more and 20.0 $\mu$m or less, and the particle size distribution in terms of D90/D10 value is 7 or less when particle diameters at 10% cumulation and 90% cumulation from smaller particle side of cumulative particle size distribution are represented by D10 and D90, respectively.

As the inorganic fine particle used in the present invention, there are listed oxides of metals, and the like, and preferably, oxides of metals belonging to IIIa to IVb groups in the periodic table of element, further preferably, aluminum oxide, titanium oxide, yttrium oxide, yttrium aluminum garnet (YAG) and the like. Among other, an alumina fine particle having refractive index revealing smaller difference of 0.1 to 0.5 from that of a transparent resin as a matrix is preferable since back scattering is smaller when the refractive index of the particle is nearer to that of the matrix, transparent resin, and particularly, in the present invention, an alumina fine particle is preferable wherein the particle is a polyhedral particle having substantially no fractured surface, the particle is an $\alpha$-alumina fine particle showing D/H ratio of 0.5 or more and 2.0 or less when the maximum particle diameter parallel to the hexagonal lattice surface of $\alpha$-alumina, hexagonal closest lattice is represented by D and the particle diameter vertical to the hexagonal closest lattice surface is represented by H, the number-average particle diameter of the $\alpha$-alumina fine particle is 0.1 $\mu$m or more and 20.0 $\mu$m or less, and the particle size distribution in terms of D90/D10 value is 7 or less when particle diameters at 10% cumulation and 90% cumulation from smaller particle side of cumulative particle size distribution are represented by D10 and D90, respectively.

The number-average particle diameter of the above-mentioned inorganic fine particle is 0.1 $\mu$m or more and 20.0 $\mu$m or less, and preferably, 0.4 $\mu$m or more and 10.0 $\mu$m or less.

When the number-average particle diameter is 20.0 $\mu$m or more, the unevenness on the surface of a layer increases, and flattening becomes difficult. Even when flattening is tried, the film thickness increases further, causing undesirable results from the standpoints of cost and reduction in the thickness of a liquid crystal panel.

As the method for producing an alumina powder of the present invention, methods described in JP-A Nos. 6-191833, 6-191835, 6-191836 and 7-206430, and the like can be used.

When the ratio of an inorganic fine particle of the present invention added to a transparent resin as a matrix in a light scattering layer is too large, the transmittance of a light decreases, and the whole body shows white-like appearance, lowering display quality, though scattering effect is enhanced. Therefore, larger ratio of an inorganic fine particle is not preferable. Additionally, the particles tend to coagulate mutually, undesirably. While, when the ratio of the inorganic fine particle is too small, scattering effect decreases, effective scattering effect can not be obtained, undesirably.

When a fine particle is mixed with a transparent resin as a matrix, the concentration of the fine particle in terms of [fine particle/(sum of fine particle and transparent resin] is preferably from 1 to 50 vol %, further preferably from 5 to 30 volt %.

The inorganic fine particle of the present invention may be subjected to treatment on surface, if necessary Preferably, organic compounds or inorganic compound containing metal ions can be used, though examples thereof are not limited to them. For example, a silane coupling agent, titanium coupling agent, aluminum-based coupling agent and the like can be used.

As the alumina fine particle of the present invention, there are exemplified Sumicorundum AA04 (number-average particle diameter: 0.4 $\mu$m), AA05 (number-average particle diameter: 0.5 $\mu$m), AA07 (number-average particle diameter: 0.7 $\mu$m) AA1 (number-average particle diameter: 1.0 $\mu$m), AA2 (number-average particle diameter: 2.0 $\mu$m), AA4 (number-average particle diameter: 4.0 $\mu$m), AA10 (number-average particle diameter: 10.0 $\mu$m) and the like manufactured by Sumitomo Chemical Co., Ltd.

The inorganic fine particle to be dispersed in a transparent resin in the present invention is not restricted to one kind of inorganic fine particle having the same particle diameter, and two or more inorganic fine particles such as those having different particle diameters and those of different kinds may be combined.

The thickness of the light scattering layer of the present invention is in the range from 0.2 $\mu$m to 100 $\mu$m. and preferably 0.5 $\mu$m or more and 50 $\mu$m or less.

In the light scattering layer of the present invention, unevenness having depths from 0.05 $\mu$m to 10 $\mu$m may be provided on the surface of this light scattering layer, if necessary.

Then, a color filter, a light scattering plate, a light scattering adhesive layer, using the light scattering resin layer of the present invention, and a liquid crystal display using at least one of them will be illustrated in detail below.

The present invention relates to a color filter in which the above-mentioned light scattering resin layer is formed on a color filter layer, showing a function for scattering of transmitted lights, and a liquid crystal display using the same.

In the present invention, the number-average particle diameter of the above-mentioned inorganic fine particle is preferably 0.4 $\mu$m or more and 20.0 $\mu$m or less, further preferably, 0.4 $\mu$m or more and 4.0 $\mu$m or less.

The thickness of the light scattering resin layer in the present invention is preferably 0.5 $\mu$m or more and 50.0 $\mu$m or less, further preferably. 0.5 $\mu$m or more and 4.0 $\mu$m or less. Since the minimum value of the preferable particle diameter of a fine particle is 0.4 $\mu$m, a value less than 0.5 $\mu$m is not preferable in view of the unevenness of the surface. While, then the thickness of the layer is too large, the transmittance of a light reduces, undesirably.

Further, as the alumina fine particle among the above-mentioned inorganic fine particles, there are exemplified Sumicorundum AA04 (number-average particle diameter: 0.4 $\mu$m), AA05 (number-average particle diameter: 0.5 $\mu$m), AA07 (number-average particle diameter: 0.7 $\mu$m), AA1 (number-average particle diameter: 1.0 $\mu$m), AA2 (number-average particle diameter: 2.0 $\mu$m) and the like manufactured by Sumitomo Chemical Co., Ltd.

Then, the method for forming a light scattering resin layer on a color filter substrate in the present invention will be illustrated below.

A color filter equipped with the light scattering resin layer of the present invention is obtained by dispersing a fine particle in a transparent resin such as an over coat resin, color resist and the like, and applying this resin on one side or both sides of a transparent substrate or on a color filter layer or in a color filter layer.

In the present invention, the transparent substrate means a glass substrate and the like which will act as a substrate for a color filter layer, and the color filter layer means each pigment layer for coloring a light transmitting through its portion.

In the present invention, when a light scattering resin layer is formed, there can be used, as the matrix, transparent resin, for example an epoxy resin, acrylic resin, acrylepoxy resin, polyester resin, polyamide resin, urethane resin, polyimide resin, or copolymer resins thereof. Further, it is also possible to utilize those obtained by adding a melamine resin to an epoxy resin. Furthermore, these resins may be ultraviolet ray-cured resins, thermally cures resins, electron beam-cured resins or resins obtained by using these curing method together.

For dispersing the above-mentioned inorganic fine particle in these transparent resins, a fine particle is added into a transparent resin dissolved in a solvent, and this mixed solution can be subjected to an ultrasonic dispersing method, ball mill, jet mill and the like.

Moreover, the inorganic fine particle of the present invention may be subjected to treatment on surface, if necessary. Preferably, inorganic compounds containing metal ions and the like or organic compounds containing metal ions and the like can be used, though examples thereof are not limited to them. For example, a silane coupling agent, titanium coupling agent, aluminum-based coupling agent and the like can be used.

As the color filter layer, a known color filter layer can be applied. Examples thereof are a dying method color filter obtained by dying a resin with a dye, a pigment dispersed type color filter obtained by using a photosensitive resin containing dispersed organic pigment and a photo lithography process, a printing method color filter obtained by an offset printing method, relief printing method or flexo printing method and the like.

For forming the above-mentioned light scattering resin layer, there can be used, for example, an offset printing method, screen printing method, roll coat method, gravure coat method, bar coat method, spin coat method, curtain coat method, spray coat method and the like.

Integration of a color filter equipped with a light scattering resin layer thus formed, as a constituent element of a liquid crystal display, can improve scattering property an improve display quality while maintaining high transmittance of a light.

Next, the light scattering plate of the present invention and a liquid crystal display equipped with this plate will be illustrated.

The present invention relates to a light scattering plate for scattering a transmitted light wherein the above-mentioned light scattering resin layer is formed on the surface of or in a scattering plate, and a liquid crystal display using the same plate.

The scattering plate means that having the above-mentioned scattering resin layer formed on the surface thereof, or that in which the above-mentioned scattering resin layer itself functions as a light scattering plate.

In the present invention, when the above-mentioned light scattering resin layer is formed on the surface of a transparent substrate, this transparent substrate is not particularly restricted and may advantageously be a transparent material such as glass, polymer film and the like. This substrate may also be used together with various liquid crystal display-related members such as a polarizing film, retardation film, brightness enhancement film, quarter wavelength plate and the like, or those obtained by application thereof into or onto the upper surface or lower surface thereof may also be permissible. A polarizing film and the like laminated with a diffraction lattice and the like may be used as the substrate.

In this case, the matrix, transparent resin, thickness, forming method thereof and the like are as in the case for forming the above-mentioned scattering resin layer on the above-described color filter.

Further, when the above-mentioned:scattering resin layer itself functions as a light scattering plate in the present invention, the light scattering plate is obtained by dispersing the above-mentioned fine particle in a transparent resin, and molding the resin into a plate or film.

As the matrix transparent resin in this case, polymers are preferable which do not cause changes in optical property and form when the light scattering plate is used at high temperature or when the resin is exposed to the temperature of laminating process with a liquid crystal cell, and thermoplastic engineering polymers of which glass transition temperature is high to a certain extent, or when a plasticizer is added, polymers of which flowing temperature is high to a certain extent are preferably used.

The lower limit of the glass transition temperature or softening temperature of a matrix polymer is determined so that no change in optical property and no deformation such as shrinkage and the like of a film occur within the temperature range in which a liquid crystal display is used, and drawing while heating is necessary in providing a retardation plate, consequently, too high glass transition temperature is not preferable industrially, leading to setting of the upper limit.

The glass transition temperature of softening temperature required for a matrix polymer is preferably from 50 to 250° C., further preferably from 70 to 230° C.

As the preferable polymer satisfying these conditions, there are exemplified polycarbonates, polyarylates, polystyrenes, polyvinyl alcohol, polyolefins, polyvinyl chloride, polyesters, polysulfones, polyether sulfones, cellulose diacetate, cellulose triacetate, ethylenevinyl alcohol copolymers and the like, and preferably, polycarbonates, polystyrenes, polyarylates, cellulose triacetate and the like are exemplified.

The thickness of a light scattering resin layer In the light scattering plate of the present invention and a liquid crystal display equipped with the plate is preferably 0.5 μm or more and 50.0 μm or less, further preferably 10.0 μm or more and 50.0 μm or less. When the thickness is too small, a reverse influence is exerted on mechanical strength, and when the thickness is too large, the evaporation speed of a solvent when a film is formed by a solvent casting method lowers, deteriorating productivity, therefore, the thickness is preferably within a certain moderate range.

The method for forming a light scattering plate when the above-mentioned scattering layer itself functions as a light scattering plate in the present invention will be illustrated.

For dispersing the inorganic fine particle in the above-mentioned transparent resin, a fine particle is added into a transparent resin dissolved in a solvent, and this mixed solution can be subjected to an ultrasonic dispersing method, ball mill, jet mill and the like.

The inorganic fine particle of the present invention may be subjected to treatment on surface in the same manner as described above, if necessary.

As the method for molding a light scattering plate comprising a transparent resin as a matrix and a fine particle, there are exemplified a solvent casting method in which a dispersion solution is cast, and extrusion molding method, calender method, press molding method and the like, and of them, a solvent casting method excellent in film thickness precision is preferable.

Integration of a light scattering plate thus formed, as a constituent element of a liquid crystal display, can improve scattering property an improve display quality while maintaining high transmittance of a light.

Next, the light scattering adhesive layer of the present invention and a liquid crystal display equipped with this layer will be illustrated.

The present invention relates to a light scattering adhesive layer which characteristically has a light scattering function in an adhesive layer by using as the above-mentioned transparent resin that having adhesion, and a liquid crystal display using the same layer.

The thickness of a light scattering resin layer in the light scattering adhesive layer of the present invention and a liquid crystal display equipped with the layer is preferably 0.5 μm or more and 50.0 μm or less, further preferably 10.0 μm or more and 50.0 μm or less. When the thickness is too small, a reverse influence is exerted on mechanical strength, and, handling in applying to a body to be adhered becomes difficult, mutual adhesion of bodies to be adhered having different surface irregularities or curvatures becomes difficult, and the like.

As the matrix, transparent resin having adhesion in the light scattering resin layer of the present invention, there are listed, for example, synthetic resin-based adhesives, emulsion-based adhesives, synthetic rubber-based adhesives and the like. As the above-mentioned synthetic resin-based adhesive, there can be utilized acrylic resin-based adhesives, epoxy resin-based adhesives, urethane resin-based adhesives, melamine resin-based adhesives, phenol resin-based adhesives, urea resin-based adhesives, cyanoacrylate resin-based adhesives and the like, or copolymers thereof and the like. As the above-mentioned emulsion-based adhesive, there can be utilized vinyl acetate resin-based emulsion-based adhesives, vinyl acetate copolymer resin-based emulsion-based adhesives, acrylic resin-based emulsion-based adhesives and the like. In addition, heat-resistance adhesives such as silicon resin-based adhesives, polyimide-based adhesives and the like, water-soluble adhesives such as polyvinyl alcohol and the like, can also be used. Further, these adhesives may appropriately contain a tackifier, softening agent, other various fillers, pigment, antioxidant, stabilizer and the like, depending on use thereof.

For forming the above-mentioned light scattering adhesive layer, there can be used, for example, an offset printing method, screen printing method, roll coat method, gravure coat method, bar coat method, spin coat method, curtain coat method, spray coat method and the like.

When a polarizing plate and retardation plate are pasted using such a light scattering adhesive layer in constituting a liquid crystal display, the adhesive layer itself act as a light scattering plate, and scattering property can be improved and display quality can be improved while maintaining high transmittance of a light.

EXAMPLES

Next, the following examples illustrate the present invention, but dot not limit the scope of the present invention.

Various measuring methods in the present invention will be shown below.

Measurement of Number-average Particle Diameter

A powder particle was photographed using a scanning electric microscope (SEM, manufactured by Nippon Denshi K.K.; T-300), and 50 to 100 particles were selected from this photography and the image was analyzed, and average value thereof was calculated.

Measurement of D10 and D90 (Measurement of Weight Cumulative Particle Size Distribution)

This was measured by a laser diffraction scattering method using Master Sizer (manufactured by Mulballoon K.K.). An alumina slurry prepared for the measurement was obtained by adding 25 g of a 0.5 wt % aqueous solution of sodium hexa-m-phosphate to 25 g of an alumina powder, and exposing the mixed solution to an ultrasonic wave for 2 minutes by a homogenizer.

Measurement of D/H

A powder particle was photographed using a scanning electric microscope (SEM, manufactured by Nippon Denshi K.K.; T-300), and 50 to 100 particles were selected from this photography and the image was analyzed, and average value thereof was calculated.

Measurement of Haze (Fog Value) and Total Light Transmittance

Haze (fog value) and total light transmittance were measured using a Haze computer (manufactured by Suga Shikenki K.K.: HGM-2DP).

Evaluation of Scattering Property

Lights emitting from a fiber type light source (manufactured by Chuo Seiki K.K.: SPH-100N) were paralleled, and irradiated a sample to be measured. The sample is inserted so that the sample surface crosses the light axis. Intensities of a light transmitted through the sample and a light scattered by the sample were measured by a light sensor and a light power meter. The angle distribution of scattered lights were measured while rotating a light sensor portion, parallel to the light axis, from −90° to 90° around the center of the light axis. Comparison of the scattering intensity was conducted using the scattering intensity ratio $I_R$:

$$I_R = I/I_o$$

wherein the light intensity when no sample is inserted is represented by $I_o$ and the light intensity when lights are scattered to certain angle direction by the sample is represented by I.

Polarized Light Analysis

Polarized light analysis was conducted using an ultraviolet-visible spectrophotometer (manufactured by Shimadzu Corp.: MPC-2200), and the depolarizability (hereinafter, referred to as polarizing coefficient) from a polarizing plate as a standard was calculated. A polarized light manifesting utterly no shift from the polarizing plate as a standard is evaluated as 100%. Wavelengths from 400 nm to 700 nm were used.]

Example 1

For performing silane coupling treatment on the surface of an alumina fine particle, an alumina fine particle was added into a silane coupling agent, dispersed for 2 hours by an ultrasonic cleaner (BRANSON 2210 manufactured by EMERSON Co., Ltd.), then, drying was conducted in vacuo for 20 minutes at 100° C. As the silane coupling agent, KBM-403 manufactured by Shin-Etsu Chemical Co., Ltd. was used, and as the alumina fine particle, Sumicorundum AA1 (number-average particle diameter: 1.0 $\mu$m) manufactured by Sumitomo Chemical Co., Ltd. was used.

Subsequently, 80 volt % of a one-pot type over coat liquid for matrix (epoxy type, V-259EX88-078X: manufactured by Nippon Steel Chemical Co., Ltd.) and 20 vol % of an alumina fine particle subjected to silane coupling treatment were mixed and dispersed for 2 hours by ultrasonic cleaner (BRANSON 2210 manufactured by EMERSON Co., Ltd.).

This was spin-coated on a glass substrate (840 rpm; 10 seconds), and pre-baked for 10 minutes at 100° C. using a clean oven, then, post-baked for 20 minutes at 230° C., to form a light scattering resin layer having a thickness of 1.5 $\mu$m.

The light scattering resin layer thus formed was subjected to the above-mentioned scattering property measurement, and haze measurement and total light transmittance measurement, to find that the scattering intensity ratio $I_R$ was 0.033 at a scattering angle of 30°, the haze was 81.2, and the total light transmittance was 97%.

Polarized light analysis was conducted to find the polarizing coefficient of 99.98%. The details are shown in Table 1.

Further, as a result of observation of the light scattering resin layer by a microscope, little coagulation was found, and approximately uniform dispersion could be confirmed visually "Good" in dispersibility in Table 1 indicates that little coagulation is found and approximately uniform dispersion is obtained.

Example 2

A light scattering resin layer was formed on a glass substrate in the same manner as in Example 1 except that as the alumina fine particle, Sumicorundum AA07 (number-average particle diameter: 0.7 $\mu$m) manufactured by Sumitomo Chemical Co., Ltd. was used.

The light scattering resin layer thus formed was subjected to the above-mentioned scattering property measurement, and haze measurement and total light transmittance measurement, to find that the scattering intensity ratio $I_R$ was 0.020 at a scattering angle of 30°, the haze was 54.3, and the total light transmittance was 96%.

Polarized light analysis was conducted to find the polarizing coefficient of 99.96%. The details are shown in Table 1.

Further, as a result of observation of the light scattering resin layer by a microscope, little coagulation was found, and approximately uniform dispersion could be confirmed visually.

Example 3

The light scattering resin layer formed in Example 1 was formed on a color filter, and this was used in combination with a liquid crystal display cell. As a result, a display cell is obtained which has improved viewing angle, contrast ratio and the like, and has excellent visibility.

Example 4

The light scattering resin layer formed in Example 2 was formed on a color filter, and this was used in combination with a liquid crystal display cell. As a result, a display cell is obtained which has improved visibility angle, contrast ratio and the like, and has excellent visibility.

Example 5

80 wt % of a polycarbonate resin and 20 wt % of methylene chloride were dissolved and mixed. 80 volt % of this mixed solution and 20 vol % of an alumina fine particle (Sumicorundum AA5, manufactured by Sumitomo Chemical Co., Ltd.) were mixed and dispersed by an ultrasonic cleaner (BRANSON 2210 manufactured by EMERSON Co., Ltd.).

The resulted dispersed solution was cast on a glass plate, and the solvent was dried to obtain a light scattering film.

The resulted light scattering film was pasted on a liquid crystal display cell and used As a result, a display cell is obtained which has improved viewing angle, contrast ratio and the like, and has excellent visibility.

Example 6

80 wt % of an acrylic adhesive (adhesive in the form of a solution. The solvent is 9:1 (by weight) mixed solvent of toluene and ethyl acetate. The concentration is 45 wt %) and 20 wt % of an alumina fine particle (Sumicorundum AA5, manufactured by Sumitomo Chemical Co., Ltd.) were mixed and dispersed.

The resulted dispersed solution was coated on a substrate film by a roll coater, and dried in a drying furnace, to obtain a light scattering adhesive.

A polarizing plate and a retardation film were pasted on a liquid crystal display cell using the resulted light scattering adhesive. As a result, a display cell is obtained which has improved viewing angle, contrast ratio and the like, and has excellent visibility.

Example 7

For performing silane coupling treatment on the surface of an alumina fine particle, an alumina fine particle was added into a silane coupling agent, dispersed for 2 hours by an ultrasonic cleaner (BRANSON 2210 manufactured by EMERSON Co., Ltd.), then, drying was conducted in vacuo for 20 minutes at 100° C. As the silane coupling agent, KBM-403 manufactured by Shin-Etsu Chemical Co., Ltd. was used, and as the alumina fine particle, Sumicorundum AA1 (number-average particle diameter: 1.0 $\mu$m) manufactured by Sumitomo Chemical Co., Ltd. was used.

Subsequently, 90 volt % of acrylic resin-based adhesives for matrix (solution type: manufactured by Lintec Co., Ltd.) and 10 vol % of an alumina fine particle (Sumicorundum AA1, manufactured by Sumitomo Chemical Co., Ltd.) subjected to silane coupling treatment were mixed and dispersed.

The dispersed solution was coated on a glass substrate by bar coater, and dried for 10 minutes at 100° C. using a clean oven, to form a light scattering resin adhesive layer The light scattering resin layer thus formed was subjected to the above-mentioned scattering property measurement, and haze measurement and total light transmittance measurement, to find that the scattering intensity ratio $I_R$ was 0.017 at a scattering angle of 30°, the haze was 84.2, and the total light transmittance was 95%.

Polarized light analysis was conducted to find the polarizing coefficient of 99.98%.

Further, as a result of observation of the light scattering resin layer by a microscope, little coagulation was found, and approximately uniform dispersion could be confirmed visually.

Example 8

A light scattering adhesive layer was formed on a glass substrate in the same manner as in Example 7 except that as the alumina fine particle, Sumicorundum AA07 was used.

The light scattering resin layer thus formed was subjected to the above-mentioned scattering property measurement, and haze measurement and total light transmittance measurement, to find that the scattering intensity ratio $I_R$ was 0.018 at a scattering angle of 30°, the haze was 79.3, and the total light transmittance was 94%.

Polarized light analysis was conducted to find the polarizing coefficient of 99.97%.

Further, as a result of observation of the light scattering adhesive layer by a microscope, little coagulation was found, and approximately uniform dispersion could be confirmed visually.

Comparative Example 1

A light scattering resin layer was formed on a glass substrate in the same manner as in Example 1 except that as the alumina fine particle, alumina (0.85 μm of number-average particle diameter) produced by a hydrolysis method using an aluminum organometal compound was used. The shape of alumina particle was not polyhedral but indefinite.

The light scattering resin layer thus formed was subjected to the above-mentioned scattering property measurement, and haze measurement and total light transmittance measurement, to find that the scattering intensity ratio $I_R$ was 0.016 at a scattering angle of 30°, the haze was 40.5, and the total light transmittance was 96%. The details are shown in Table 1.

Polarized light analysis was conducted to find the polarizing coefficient of 99.88%. The details are shown in Table 1.

Further, as a result of observation of the light scattering resin layer by a microscope, a lot of coagulated portions were found, and no excellent dispersed condition was confirmed visually. "No good" in dispersibility in Table 1 indicates that a lot of coagulated portions are found, and no excellent dispersed condition is obtained Comparative Example 2

A light scattering resin layer was formed on a glass substrate in the same manner as in Example 1 except that as the alumina fine particle, alumina (0.65 μm of number-average particle diameter) produced by a hydrolysis method using an aluminum organometal compound was used. The shape of alumina particle was not polyhedral but indefinite.

The light scattering resin layer thus formed was subjected to the above-mentioned scattering property measurement, and haze measurement and total light transmittance measurement, to find that the scattering intensity ratio $I_R$ was 0.011 at a scattering angle of 30°, the haze was 34.0, and the total light transmittance was 94%. The details are shown in Table 1.

Polarized light analysis was conducted to find the polarizing coefficient of 99.87%. The details are shown in Table 1.

Further, as a result of observation of the light scattering resin layer by a microscope, a lot of coagulated portions were found, and no excellent dispersed condition was confirmed visually.

TABLE 1

| | Example 1 | Example 2 | Comparative Example 1 | Comparative Example 2 |
|---|---|---|---|---|
| Alumina fine particle | AA1 | AA07 | Hydrolysis method | Hydrolysis method |
| Number-average particle diameter (μm) | 1.0 | 0.7 | 0.85 | 0.65 |
| Form | Polyhedral | Polyhedral | Ununiform | Ununiform |
| Thickness of light scattering layer (μm) | 1.58 | 1.71 | 1.71 | 1.69 |
| Scattering intensity ratio $I_R$ | 0.033 | 0.020 | 0.016 | 0.011 |
| Haze (fog value) (%) | 81.2 | 54.3 | 40.5 | 34.0 |
| Total light transmittance (%) | 97 | 96 | 96 | 94 |
| Polarizing coefficient (%) | 99.98 | 99.96 | 99.88 | 99.87 |
| Dispersibility | Good | Good | No good (a lot of coagulation) | No good (a lot of coagulation) |

Example 9

A light scattering resin layer was formed on a glass substrate in the same manner as in Example 1 excepting the silane coupling treatment on the alumina fine particle.

As a result of observation of the light scattering resin layer by a microscope, coagulated portions were found a little as compared with Example 1.

According to the present invention, a light scattering layer can be obtained in which the dispersibility of a fine particle in a transparent resin as a matrix is high and polarization property and forward scattering property are improved and light transmittance is excellent. Further, integration of a color filter, light scattering plate or light scattering adhesive layer, equipped with the above-mentioned light scattering layer, can improve scattering property an improve visibility while maintaining high transmittance of a light.

What is claimed is:

1. A light scattering resin layer providing scattering of a transmitted light by dispersion of an inorganic fine particle in a transparent resin, wherein said fine particle is a polyhedral particle having substantially no fractured surface, L/S ratio is 2.0 or less when the major axis length is represented by L and the minor axis length is represented by S, the number-average particle diameter of said fine particle is 0.1 μm or more and 20.0 μm or less, and the particle size distribution in terms of D90/D10 value is 7 or less when particle diameters at 10% cumulation and 90% cumulation from smaller particle side of cumulative particle size distribution are represented by D10 and D90, respectively.

2. The light scattering layer according to claim 1, wherein the inorganic fine particle is a polyhedral particle having substantially no fractured surface, the particle is an α-alumina fine particle showing D/H ratio of 0.5 or more and 2.0 or less when the maximum particle diameter parallel to the hexagonal lattice surface of α-alumina, hexagonal closest lattice is represented by D and the particle diameter vertical to the hexagonal closest lattice surface is represented by H, the number-average particle diameter of the α-alumina fine particle is 0.1 μm or more and 20.0 μm or less, and the particle size distribution in terms of D90/D10 value is 7 or less when particle diameters at 10% cumulation and 90% cumulation from smaller particle side of cumulative particle size distribution are represented by D10 and D90, respectively.

3. The light scattering resin layer according to claim 1 or 2, wherein the inorganic fine particle is subjected to surface treatment.

4. The light scattering resin layer according to claim 3, wherein the inorganic fine particle is subjected to surface treatment with an organic compound containing a metal ion or an inorganic compound containing a metal ion.

5. The light scattering resin layer according to claim 1, wherein the thickness of the light scattering resin layer is within the range from 0.2 μm to 100 μm.

6. The light scattering resin layer according to claim 1, wherein the surface of the light scattering layer has unevenness of depths from 0.05 μm to 10 μm.

7. A color filter for a liquid crystal display, wherein the light scattering resin layer of claim 1 is provided on one or both sides of the surfaces of a transparent substrate or on a color filter layer.

8. The color filter for a liquid crystal display, wherein the light scattering resin layer of claim 1 is provided in a color filter layer.

9. A liquid crystal display, wherein the color filter for a liquid crystal display of claim 7 or 8 is contained as a constituent element thereof.

10. A light scattering plate, wherein the light scattering resin layer of claim 1 is used on the surface of or in a scattering plate.

11. A liquid crystal display, wherein the light scattering plate of claim 10 is equipped on at least one side either of the outer side or the inner side of a liquid crystal cell.

12. A light scattering adhesive layer, wherein light scattering function is imparted to an adhesive layer by using a resin having adhesion as said transparent resin in the light scattering resin layer of claim 1.

13. A liquid crystal display, wherein the light scattering adhesive layer of claim 12 is equipped on at least one side either of the outer side or the inner side of a liquid crystal cell.

* * * * *